(12) United States Patent
Metka et al.

(10) Patent No.: US 11,518,446 B2
(45) Date of Patent: Dec. 6, 2022

(54) PIVOTING GUTTER FOR A VEHICLE

(71) Applicant: Honda Motor Co., Ltd., Tokyo (JP)

(72) Inventors: Matthew L. Metka, Plain City, OH (US); Pirooz Moradnia, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/215,953

(22) Filed: Mar. 29, 2021

(65) Prior Publication Data

US 2022/0306215 A1    Sep. 29, 2022

(51) Int. Cl.
*B60S 1/06* (2006.01)
*B62D 25/08* (2006.01)
*B62D 25/24* (2006.01)

(52) U.S. Cl.
CPC ............... *B62D 25/24* (2013.01); *B60S 1/06* (2013.01); *B62D 25/081* (2013.01)

(58) Field of Classification Search
CPC ...... B60S 1/04; B60S 1/06; B60S 1/28; B60S 1/0491; B60S 1/0461; B62D 25/04; B60R 13/07
See application file for complete search history.

(56) References Cited

U.S. PATENT DOCUMENTS

| | | | |
|---|---|---|---|
| 5,118,157 A | 6/1992 | Tamura | |
| 6,899,376 B1 | 5/2005 | Sullivan | |
| 7,367,609 B2 | 5/2008 | Grudzinski et al. | |
| 8,146,979 B2 | 4/2012 | Renke et al. | |
| 8,454,083 B2 | 6/2013 | Dimitriou et al. | |
| 10,173,510 B2 | 1/2019 | Vojtisek et al. | |
| 10,449,912 B2 | 10/2019 | Okabe et al. | |
| 10,589,610 B2 | 3/2020 | Takashi | |
| 10,597,088 B2 | 3/2020 | Gulker et al. | |
| 2010/0320796 A1 | 12/2010 | Hoefer et al. | |
| 2016/0129771 A1 | 5/2016 | Nakai et al. | |

(Continued)

FOREIGN PATENT DOCUMENTS

| | | |
|---|---|---|
| DE | 3119358 | 12/1982 |
| DE | 3048889 C2 * | 1/1988 |

(Continued)

OTHER PUBLICATIONS

Machine translation of DE-202015101955-U1.*

(Continued)

*Primary Examiner* — D Glenn Dayoan
*Assistant Examiner* — Kevin P Weldon
(74) *Attorney, Agent, or Firm* — Rankin, Hill & Clark LLP

(57) ABSTRACT

A vehicle wiper system includes a drive mechanism, a wiper and a gutter each connected to the drive mechanism, and a locking mechanism. The wiper has a stowed position and an extended position. The drive mechanism reciprocally moves the wiper about a pivot axis to sweep a defined area of a windshield. The drive mechanism moves the gutter together with the wiper about the pivot axis between a stowed position and a deployed position wherein the gutter extends along a lateral edge of the windshield. The locking mechanism is configured to lock the gutter in the deployed position allowing the gutter to be statically disposed at the deployed position while the wiper is reciprocally moved about the pivot axis.

18 Claims, 8 Drawing Sheets

(56) References Cited

U.S. PATENT DOCUMENTS

| | | | | |
|---|---|---|---|---|
| 2019/0023229 A1* | 1/2019 | LoSacco | ............... | B60S 1/28 |
| 2021/0402959 A1* | 12/2021 | Zielinski | ............... | B60S 1/28 |

FOREIGN PATENT DOCUMENTS

| | | | | |
|---|---|---|---|---|
| DE | 3936372 | | 5/1991 | |
| DE | 4307303 | | 9/1994 | |
| DE | 102004042703 | | 3/2006 | |
| DE | 19907390 | | 8/2008 | |
| DE | 102009009469 | | 8/2010 | |
| DE | 102011086750 | A1 * | 5/2013 | ............ B60S 1/0461 |
| DE | 102012221993 | | 6/2014 | |
| DE | 102012221994 | | 6/2014 | |
| DE | 102012221995 | | 6/2014 | |
| DE | 202015101955 | U1 * | 6/2015 | ............ B60J 10/16 |
| DE | 102014017103 | | 5/2016 | |
| EP | 0952018 | | 10/1999 | |
| EP | 2353903 | | 8/2011 | |
| EP | 2429862 | | 3/2012 | |
| JP | H11334358 | | 12/1999 | |
| JP | 2010058656 | | 3/2010 | |
| KR | 19980010798 | | 5/1998 | |
| KR | 200145667 | | 6/1999 | |
| KR | 20010010064 | A * | 2/2001 | |
| KR | 10-0291061 | | 6/2001 | |
| KR | 20050045390 | A * | 5/2005 | ............... B60S 1/28 |
| KR | 100494729 | | 6/2005 | |
| KR | 101324324 | | 11/2013 | |
| KR | 20140029802 | | 3/2014 | |

OTHER PUBLICATIONS

Machine translation of DE-3048889-C2.*
EZE-RV Gutter System—10' Package, Ultra White|Camping World, date printed May 4, 2020, https://www.campingworld.com/eze-rv-gutter-system10%27-package---ultra-white-16962.html.
National Guard, Dark Bronze Rain Drip Guard, Flange Height ⅝", Projection 2-½", Length 76", date printed May 4, 2020, https://www.grainger.com/product/NATIONAL-GUARD-Dark-Bronze-Rain-Drip-Guard-45AA36.

* cited by examiner

PIVOTING GUTTER FOR A VEHICLE

BACKGROUND

For improved performance and efficiency, vehicles are incentivized to adopt aerodynamic shapes featuring a smooth exterior surface, including the exterior surface between a windshield and side windows. For improved driver visibility through side windows in raining weather conditions, vehicles are also incentivized to adopt elements such as gutter channels interposed between the windshield and the side windows along the exterior surface. Gutter channels interposed between the windshield and a side window are configured for preventing rain from sliding across the exterior surface of the vehicle, from the windshield to the side window according to a headwind of the vehicle when the vehicle is being driven.

Known gutter channels are formed from static incongruities in paneling along the exterior surface of the vehicle to catch rain water between the windshield and a window, and guide the caught rain water over a top of the vehicle using the headwind of the vehicle. While known gutter channels may successfully prevent rain on the front of the vehicle from sliding to the side windows in raining weather conditions, the static incongruities forming the gutter channels disrupt the otherwise smooth exterior surface and reduce an aerodynamic aspect thereof (e.g., by increasing an aerodynamic drag of the vehicle), even when the vehicle is driven outside raining weather conditions.

BRIEF DESCRIPTION

According to one aspect, a wiper system for a vehicle comprises a drive mechanism, a wiper operably connected to the drive mechanism, and a gutter operably connected to the drive mechanism. The wiper has a stowed position and an extended position. The drive mechanism is configured to reciprocally move the wiper about a pivot axis to sweep a defined area of an exterior surface of a windshield. The drive mechanism is configured to move the gutter together with the wiper about the pivot axis between a stowed position and a deployed position wherein the gutter extends along a lateral edge of the windshield.

According to another aspect, a vehicle comprises a body including an A-pillar. A windshield has an exterior surface and a lateral edge secured to the A-pillar. The exterior surface of the windshield is substantially continuous with an exterior surface of the A-pillar. A drive mechanism is coupled to the body. A windshield wiper is operably connected to the drive mechanism. The wiper has a stowed position and an extended position. The drive mechanism is configured to reciprocally move the windshield wiper about a pivot axis to sweep a defined windshield area. A gutter is operably connected to the drive mechanism. The drive mechanism is configured to move the gutter together with the windshield wiper about the pivot axis between a stowed position and a deployed position wherein the gutter extends along the lateral edge of the windshield. The gutter is configured to be statically disposed in the deployed position while the windshield wiper is reciprocally moved about the pivot axis.

According to another aspect, a method of operating a wiper system of a vehicle is provided. The wiper system includes a wiper having a stowed position and an extended position, and a gutter having a stowed position and a deployed position. The method comprises coupling the wiper to the gutter at the respective stowed positions; actuating a drive mechanism in response to one of a user command and a sensor input indicating water on an exterior surface of windshield to move the wiper together with the gutter about a common pivot axis over the exterior surface of the windshield to the respective extended position and the deployed position, where in the deployed position the gutter is located along a lateral edge of the windshield; locking the gutter at the deployed position via a locking mechanism; and with the gutter locked at the deployed position reciprocally moving the wiper via the drive mechanism about the pivot axis.

DETAILED DESCRIPTION

Figure 1:
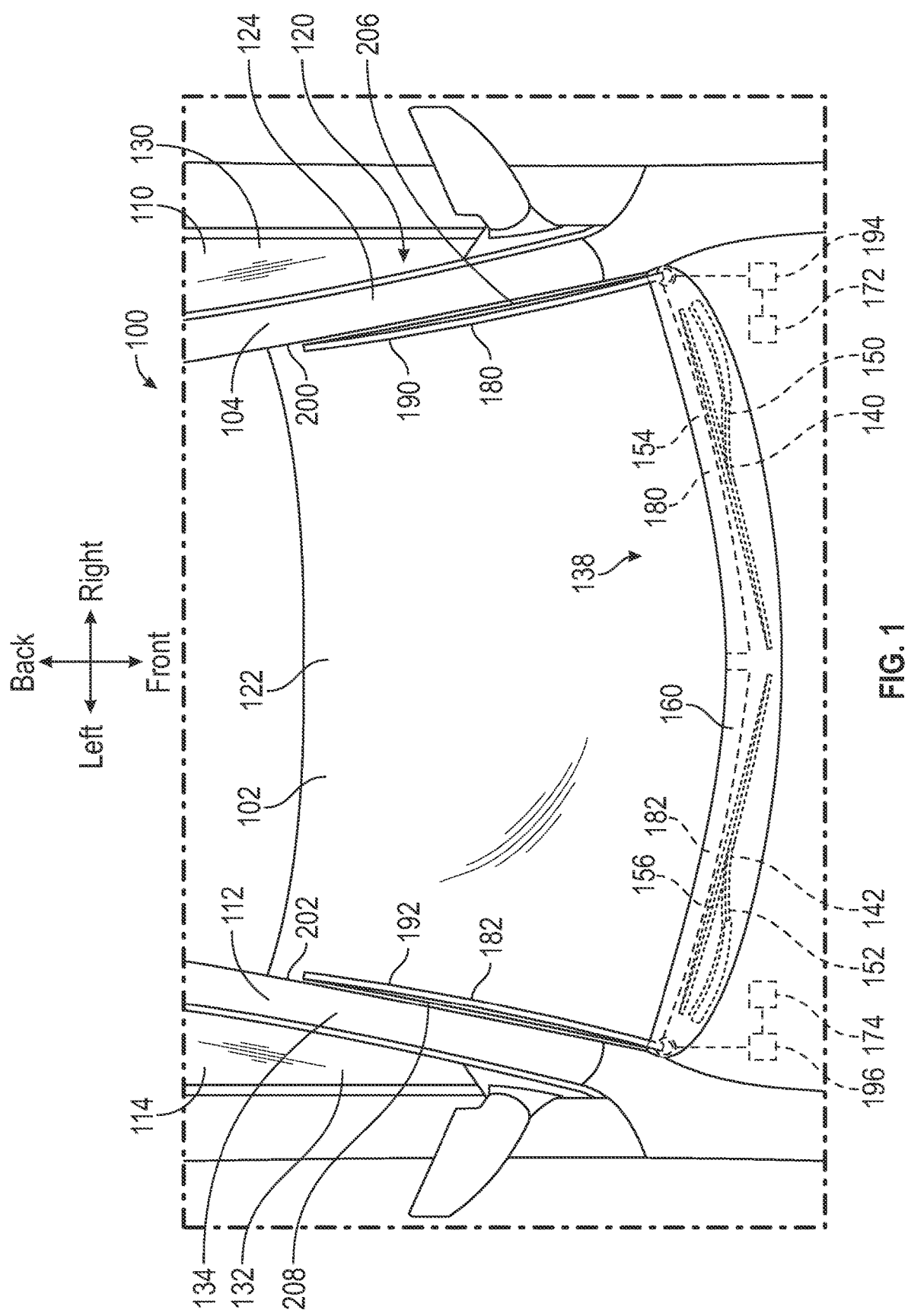
FIG. 1 is top partial top schematic view of a vehicle showing operation of a wiper system according to one aspect of the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a vehicle 100 including a front windshield 102, a first (i.e., right) A-pillar 104, a first (i.e., driver's) side window 110, a second (i.e., left) A-pillar 112, and a second (i.e., passenger's) side window 114. As is known in the art, the first and second A-pillars define part of a vehicle body, and seals can be provided between an interior surface 116 of the windshield 102 and each of the first and second A-pillars (for example, see seal 118 in FIG. 2). The first A-pillar 104 is interposed between and separates the windshield 102 from the first side window 110 in a lateral (i.e., width) direction of the vehicle 100, specifically in a left-right direction of the vehicle 100, such that an exterior surface 120 of the vehicle 100 includes an exterior surface 122 of the windshield 102, an exterior surface 124 of the first A-pillar 104 (defined, for example, by an outer trim member), and an exterior surface 130 of the first side window 110 along the lateral direction of the vehicle 100. As depicted, the exterior surface 124 of the first A-pillar 104 is substantially continuous or flush with the exterior surface 122 of the windshield 102 and the exterior surface 130 of the first side window 110 such that an aerodynamic curve or contour of the exterior surface 120 of the vehicle 100 is substantially continuous from the exterior surface 122 of the windshield 102 to the exterior surface 130 of the first side window 110 across the exterior surface 124 of the first A-pillar.

The second A-pillar 112 features a construction similar to the first A-pillar 104, where the second A-pillar 112 is interposed between and separates the windshield 102 from the second side window 114 in the lateral direction of the vehicle 100, specifically in a right-left direction of the vehicle 100, such that the exterior surface 120 of the vehicle 100 includes an exterior surface 132 of the second side window 114, an exterior surface 134 of the second A-pillar 112 (defined, for example, by an outer trim member), and the exterior surface 122 of the windshield 102 along the lateral direction of the vehicle 100. As depicted, the exterior surface 134 of the second A-pillar 112 is substantially continuous or flush with the exterior surface 122 of the windshield 102 and the exterior surface 132 of the second side window 114 such that an aerodynamic curve or contour of the exterior surface 120 of the vehicle 100 is substantially continuous from the exterior surface 122 of the windshield 102 to the exterior surface 130 of the first side window 110 across the exterior surface 134 of the second A-pillar 112.

The windshield 102 is interposed between and separates the first A-pillar 104 and the second A-pillar 112 in the lateral direction of the vehicle 100, and the exterior surface 122 of the windshield 102 is continuous between the first A-pillar 104 and the second A-pillar 112 in the lateral direction of the vehicle 100. Therefore, because the vehicle 100 is devoid of known gutter channels formed from static incongruities between the windshield 102 and each of the first and second A-pillars 104, 112, an aerodynamic curve or contour of the exterior surface 120 of the vehicle 100 is substantially continuous from the exterior surface 124 of the first A-pillar 104 to the exterior surface 134 of the second A-pillar 112 across exterior surface 122 of the windshield 102 in the lateral direction of the vehicle 100. The aerodynamic curve or contour of the exterior surface 120 can further be substantially continuous from the exterior surface 130 of the first side window 110 to the exterior surface 132 of the second side window 114 across the exterior surface 124 of the first A-pillar 104, the exterior surface 122 of the windshield 102, and the exterior surface 134 of the second A-pillar 112 in the lateral direction of the vehicle 100; although, this is not required. It should be appreciated that the term static incongruity means a convexity or concavity formed in the exterior surface 120 of the vehicle 100 between the windshield 102 and each of the first and second A-pillars 104, 112 other than any exterior seal or decorative trim that may be provided.

Further depicted in FIG. 1, the vehicle 100 has a wiper system 138 including a pair of windshield wipers 140, 142 connected to the vehicle body and configured for wiping the exterior surface 122 of the windshield 102. When viewed from the front side of the vehicle 100, the windshield wiper 140 is arranged in the right side part of the vehicle 100, and the windshield wiper 142 is arranged in the left side part of the vehicle. Each windshield wiper 140, 142 has a wiper arm 150, 152, a wiper blade 154, 156 attached to the wiper arm 150, 152, and a wiper drive mechanism (not shown) operably connected to the wiper arm to move the wiper arm about a drive or pivot axis from a stowed position to an optional resting position and then reciprocally move the wiper arm between the stowed and/or resting position and an extended position. It should be appreciated that the stowed position and the resting position can be separate positions for each windshield wiper 140, 142 or can be combined as a common single position for each windshield wiper 140, 142. As is known in the art, the wiper drive mechanism can have an electric motor and a speed reduction mechanism.

Figure 2:
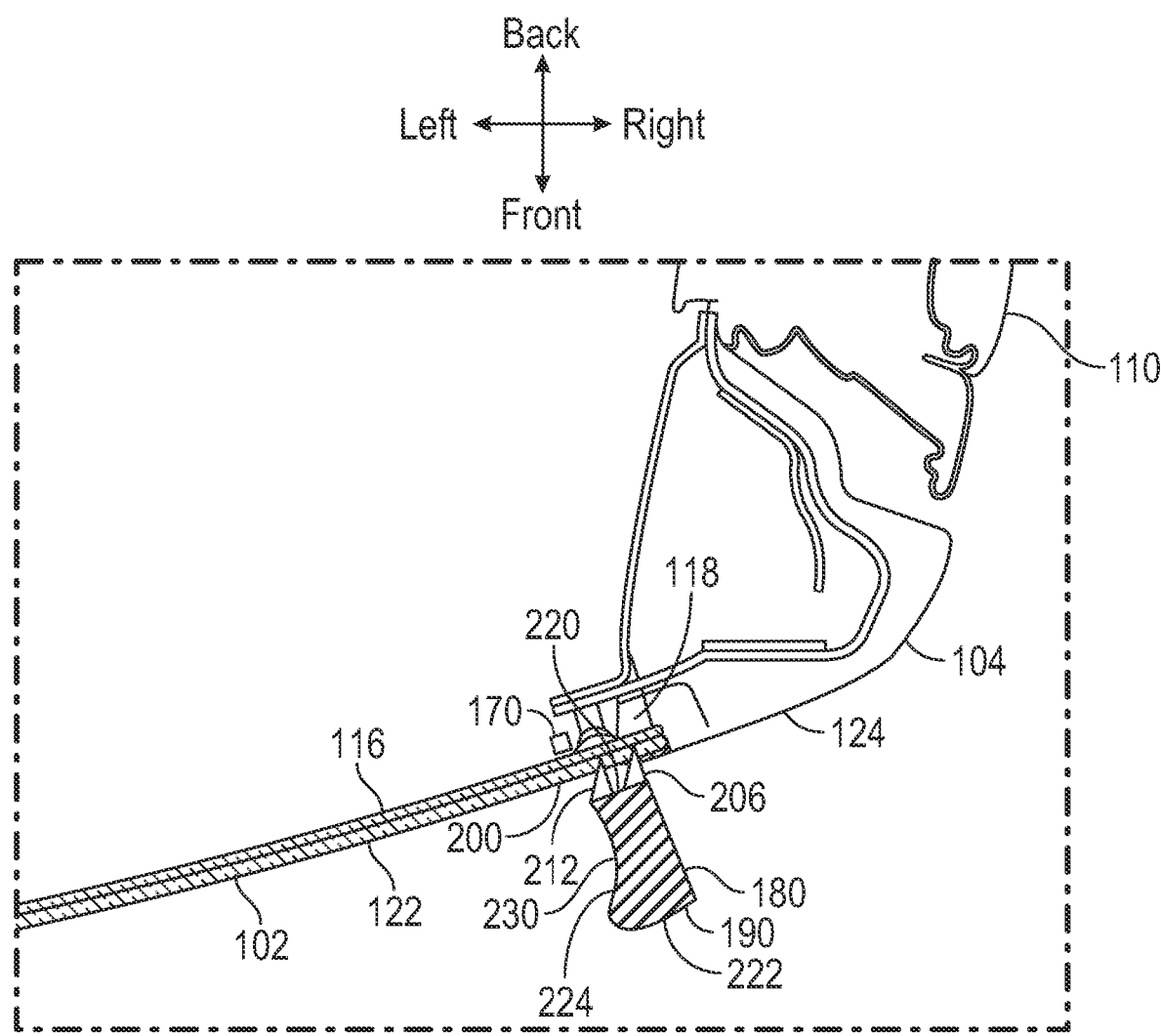
FIG. 2 is a partial cross-sectional view of a windshield and an A-pillar along a longitudinal, front-back direction of the vehicle of FIG. 1.

A cowl or cowl cover 160 is provided on the front side of the windshield 102. The cowl 160 is connected to the vehicle body and arranged in the lateral direction of the vehicle 100 along the front edge of the windshield 102. The wiper drive mechanism for each windshield wiper 140, 142 can be provided below the cowl 160. Note that, "above" denotes an outside direction of the vehicle 100, and "below" denotes an inside direction of the vehicle 100. The windshield wipers 140, 142 are swingable within a predetermined range, and when the wiper arms 150, 152 operate reciprocally, the wiper blades 154, 156 wipe or sweep a defined area of the exterior surface 122 of the windshield 102 (e.g. remove or control the flow of water on the exterior surface 122). Rain or moisture sensors (only sensor 170 is schematically depicted in FIG. 2) can be provided on the vehicle 100 (e.g., on the windshield 102 adjacent the first A-pillar 104) for a number of purposes. By way of example, input from the sensors can be used for automatically turning on the windshield wipers 140, 142 when an amount of water (typically an amount in excess of a nominal amount) is detected on the exterior surface 122 of the windshield 102, and for adjusting the speed of the windshield wipers 140, 142 based on the amount of water that is detected. For example, a controller 172, 174 (e.g., a computer processing unit) may select a wiping mode of the respective windshield wiper 140, 142 and regulate or control a voltage supplied to the wiper drive mechanism based on a detected amount of water by the sensors and inputted to the controller. The controllers 172, 174 may be part of a main electronic control unit for various electronically implemented vehicle systems. Although the controllers 172, 174 are shown as separate components, it should be contemplated that the controller can be integrated into a single processing unit.

According to the present disclosure, the wiper system 138 of the vehicle 100 has a pair of rain or water gutters 180, 182. The gutters 180, 182 are shaped to prevent water from sliding across the exterior surface 120 of the vehicle 100, from the windshield 102 to the first and second side windows 110, 114 according to a headwind of the vehicle when the vehicle is being driven. When viewed from the front side of the vehicle 100, the gutter 180 is arranged in the right side part of the vehicle 100, and the gutter 182 is arranged in the left side part of the vehicle. Each gutter 180, 182 has a gutter arm 190, 192 and a drive mechanism 194, 196 operably connected to the respective gutter arm 190, 192 to move or swing the gutter arm about a drive axis within a predetermined range between a stowed position (shown in hidden lines in FIG. 1) and a deployed position. Similar to the wiper drive mechanism, the drive mechanism 194, 196 can have an electric motor and a speed reduction mechanism. It should be appreciated that the wiper drive mechanism and the drive mechanism 194, 196 can be integrated into a single drive mechanism that is operably connected to the windshield wipers 140, 142 and the gutters 180, 182. According to this aspect, the windshield wipers 140, 142 and the gutters 180, 182 can be moved about separate drive axes as described above (for example, by linkages, gears, belts, and the like coupled to the single drive mechanism) or can be moved about a common drive axis as described hereafter.

With reference to FIG. 1, in the stowed position the gutter arm 190 is extended in the lateral direction of the vehicle 100, and in the deployed position the gutter arm 190 is extended in a longitudinal direction of the vehicle 100, specifically a front-back direction of the vehicle, along a first (i.e., right) lateral edge 200 of the windshield 102. According to one aspect, in the deployed position the gutter arm 190 extends along a majority of a length of the first lateral edge 200 of the windshield. Similarly, in the stowed position the gutter arm 192 is extended in the lateral direction of the vehicle 100, and in the deployed position the gutter arm 192 is extended in the front-back direction of the vehicle along a second (i.e., left) lateral edge 202 of the windshield 102. According to one aspect, in the deployed position the gutter arm 192 also extends along a majority of a length of the second lateral edge 202 of the windshield. By having the gutter arms 190, 192 extended in this manner substantially all of the water on the exterior surface 122 of the windshield can be channeled away from the first and second A-pillars 104, 112. Further depicted in FIG. 1, in the stowed position each gutter arm 190, 192 is covered by the cowl 160 of the vehicle and is located rearward of the respective wiper arm 150, 152 of the windshield wiper 140, 142 in the front-back direction of the vehicle. With this arrangement, the gutter arms 190, 192 are substantially hidden in top and side views of the vehicle 100, thereby preserving the aesthetics of the vehicle 100, and the gutter arms can first move to the deployed positions unobstructed by and before operation of the wiper arms 150, 152.

In the depicted embodiment, a seal 206, 208 is connected to each respective gutter arm 190, 192 for engaging the exterior surface 122 of the windshield 102 in the deployed position of the gutter arm 190, 192, thereby preventing water from flowing under the gutter arm. The seal 206, 208 extends parallel to the gutter arm 190, 192 (in a manner similar to the wiper blade 154, 156) and can be sized and configured to wipe the exterior surface 122 of the windshield 102 as the gutter arm 190, 192 is moved from the stowed position to the deployed position. To ensure proper engagement with the exterior surface 122 of the windshield 102 in the deployed position, the seal 206, 208 connected to each respective gutter arm 190, 192 is an outboard seal, and each gutter arm 190, 192 has connected thereto an inboard seal (only inboard seal 212 connected to gutter arm 190 is visible, see FIG. 2). In the deployed position of each gutter arm 190, 192, the outboard seal is closer to the A-pillar than the inboard seal, and each of the outboard seal and inboard seal engages the exterior surface 122 of the windshield 102.

In FIG. 2 the gutter 180 includes the gutter arm 190. The gutter arm 190 includes a bottom surface 220 (i.e., the surface facing the exterior surface 122 of the windshield 102), a top surface 222 opposite the bottom surface, an inboard surface 224 (i.e., the surface directed toward the windshield 102 in the deployed position) and an outboard surface 226 opposite the inboard surface 224. The bottom surface 220 is spaced from the exterior surface 122 and each of the outboard seal 206 and the inboard seal 212 are connected to the bottom surface 220. It should be appreciated that in the stowed position of the gutter 180 air stays attached to the first A-pillar 104, and in the deployed position of the gutter 180 air will separate, with the gutter being adapted to capture water droplets. According to one aspect, the inboard surface 224 of the gutter arm 190 is shaped to define a channel 230 for capturing the water droplets by being curved inwardly toward the outboard surface 226. The top surface 222 of the gutter arm 190 can have an aerodynamic shape configured so that air re-attaches to the first A-pillar 104 while water droplets are captured within the channel 230. The channel 230 can also collect water from exterior surface 122 of the windshield 102 and direct the water away from the first A-pillar 104. It should be appreciated that the gutter arm 192 of the gutter 182 can be constituted in the same way as the gutter arm 190 of the gutter 180.

The operation of the gutters 180, 182 can be controlled by the same controllers 172, 174 that control operation of the windshield wipers 140, 142 or by separate controllers similar to the controllers 172, 174. By way of example, the controllers 172, 174 (or separate controller) can be configured to actuate the drive mechanism 194, 196 coupled to the respective gutter arms 190, 192 in response to input from a user (e.g., by the driver actuating a switch or lever in the vehicle) and/or from input of the rain sensor 170 that an amount of water on the windshield 102 exceeds a nominal amount of water. It should be appreciated that the windshield wipers 140, 142 can be actuated independent of the gutters 180, 182 and the rearward positioning of the gutters relative to the windshield wipers does not impede independent operation of the windshield wipers (e.g., the drive mechanisms 194, 196 can be configured to raise the gutters 180, 182 allowing for independent operation of the windshield wipers 140, 142). For example, deployment of the gutters 180, 182 may not be necessary when a driver is simply removing excess water from the windshield 102 (e.g., after a car wash) or when the windshield 102 is being cleaned while driving as is known in the art. Therefore, where there is not an input from a user, actuation of the drive mechanism 194, 196 by the controllers 172, 174 (or separate controllers) can be generally limited to a vehicle driving condition where an amount of water detected by the sensor 170 exceeds a nominal amount of water.

As is evident from the foregoing, a method of operating a wiper system 138 of a vehicle 100 including a gutter 180, 182 is provided. The method comprises actuating a drive mechanism 194, 196 of the gutter 180, 182 in response to one of a user command and a sensor input indicating water on a windshield 102; and moving an arm 190, 192 of the gutter 180, 182 operably connected to the drive mechanism 194, 196 from a stowed position where the arm is covered by a cowl 160 of the vehicle 100 to a deployed position where the arm is located along a lateral edge 200, 202 of the windshield 102, wherein an inboard side of the arm 190, 192 is channel-shaped to direct water away from a side window 110, 114. The method further comprises sealingly engaging the exterior surface 122 of the windshield 102 with the arm 190, 192 to prevent water from flowing beneath the arm in the deployed position by providing a seal between the arm 190, 192 and the exterior surface 122 of the windshield 102, the seal connected to the arm and extended parallel to the arm. The method further comprises positioning the arm 190, 192 of the gutter 180, 182 in the stowed position rearward of a windshield wiper 140, 142 in a front-back direction of the vehicle to allow unobstructed movement of the arm to the deployed position.

With reference now to FIGS. 3-18, a wiper system 300 according to another aspect of the present disclosure for the vehicle 100 is depicted. The wiper system 300 includes a windshield wiper 302 connected to the vehicle body and configured for wiping or sweeping a defined area of the exterior surface 122 of the windshield 102. When viewed from the front side of the vehicle 100, the windshield wiper 140 is arranged in the right side part of the vehicle 100. It should be appreciated that another windshield wiper (not shown) is arranged in the left side part of the vehicle. The windshield wiper 302 has a wiper arm 304, a wiper blade 306 attached to the wiper arm 304.

The wiper system 300 further includes a water or rain gutter 310 connected to the vehicle body and operable with the windshield wiper 302. Again, it should be appreciated that another gutter (not shown) can be provided with the windshield wiper arranged in the left side part of the vehicle.

The gutter 310 has a gutter arm 312 that can be shaped similar to the gutter arm 190 described above (i.e., an aerodynamic shaped top surface and a channel shaped inboard surface), and can include similar inboard and outboard seals extended parallel to the gutter arm 312 for engaging the exterior surface 122 of the windshield 102. Therefore, the gutter 310 is configured to prevent water droplets entrained in a headwind of the vehicle when the vehicle is being driven from collecting on the first side window 110. Particularly, the gutter 310 is configured to capture the water droplet from air separated by the gutter, and is configured so that air re-attaches to the first A-pillar 104 while water droplets are captured. The gutter 310 is also configured to prevent water from sliding across the exterior surface 120 of the vehicle 100, from the windshield 102 to the first side window 110 according to a headwind of the vehicle when the vehicle is being driven.

As depicted in FIGS. 3-11, a drive mechanism 320 is operably connected to the windshield wiper 302 to move the wiper arm 304 about a drive or pivot axis 322 (FIG. 12) from a stowed position where the windshield wiper 302 is concealed below the cowl 160 to an optional resting position and then reciprocally move the wiper arm 304 between the stowed position and/or resting position and an extended position. Again, it should be appreciated that the stowed position and the resting position can be separate positions for the windshield wiper 302 or can be combined as a common single position for the windshield wiper 302. The same drive mechanism 320 is operably connected to the gutter 310 to move or swing the gutter arm 312 about the same pivot axis 322 within a predetermined range between a stowed position and a deployed position. In the stowed position the gutter arm 312 is extended in the lateral direction of the vehicle 100 and can be covered by the cowl 160, and in the deployed position the gutter arm 312 is extended in the longitudinal direction of the vehicle 100, specifically the front-back direction of the vehicle, along the first (i.e., right) lateral edge 200 of the windshield 102. According to one aspect, in the deployed position the gutter arm 312 extends along a majority of a length of the first lateral edge 200 of the windshield 102 so that substantially all of the water on the exterior surface 122 of the windshield can be channeled away from the first A-pillar 104, and, in turn, the first side window 110.

Figure 8:
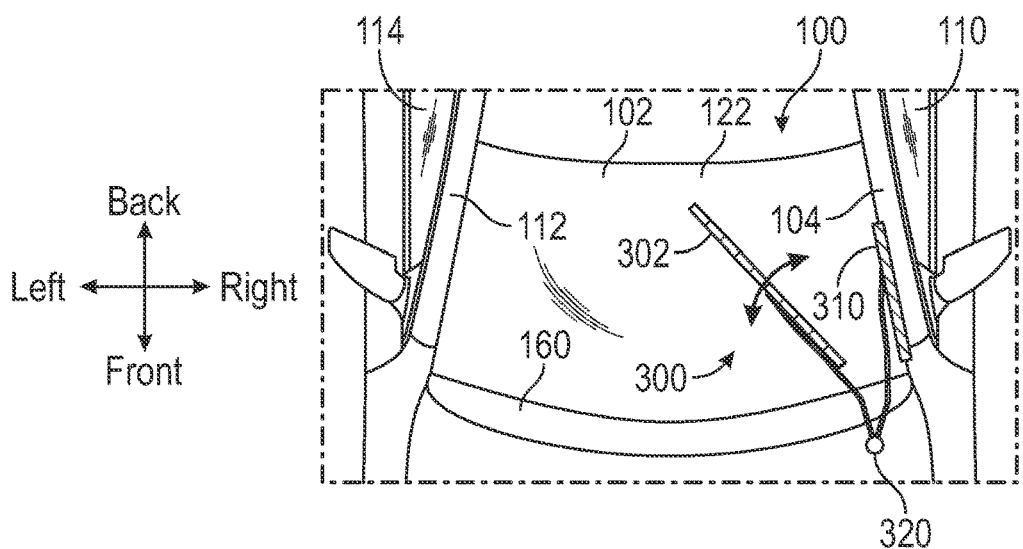
Figure 9:
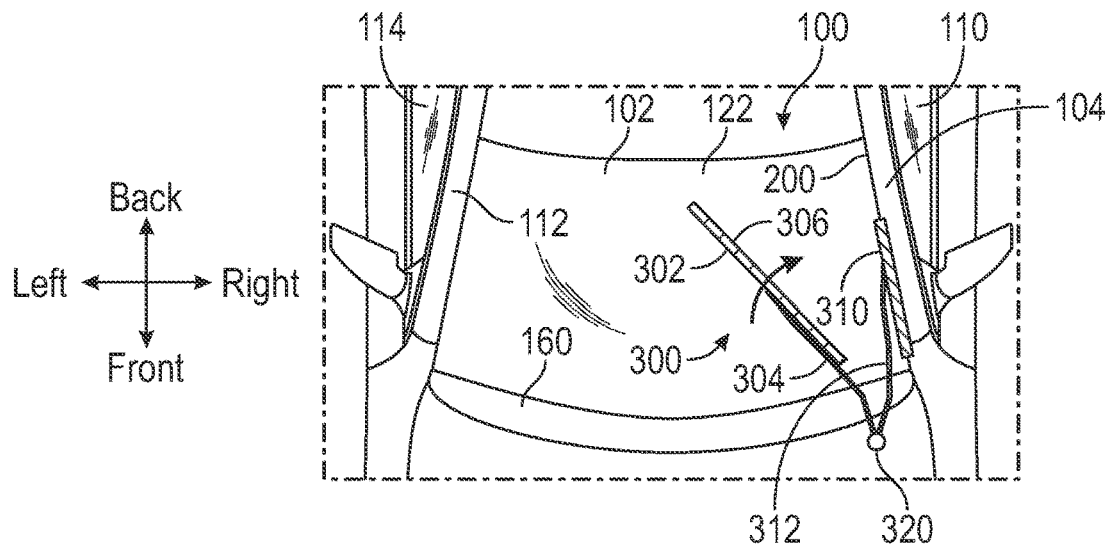
Figure 10:
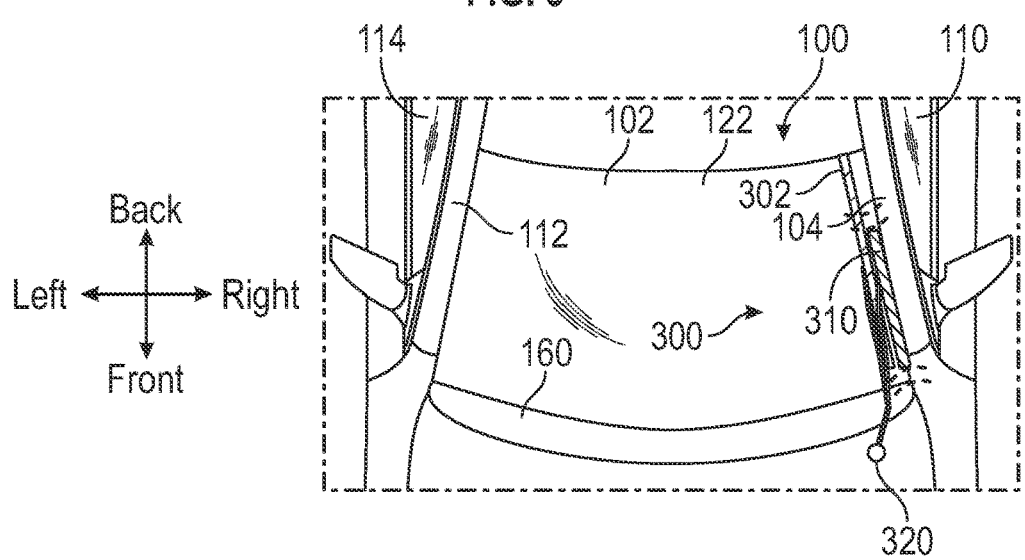
Figure 11:
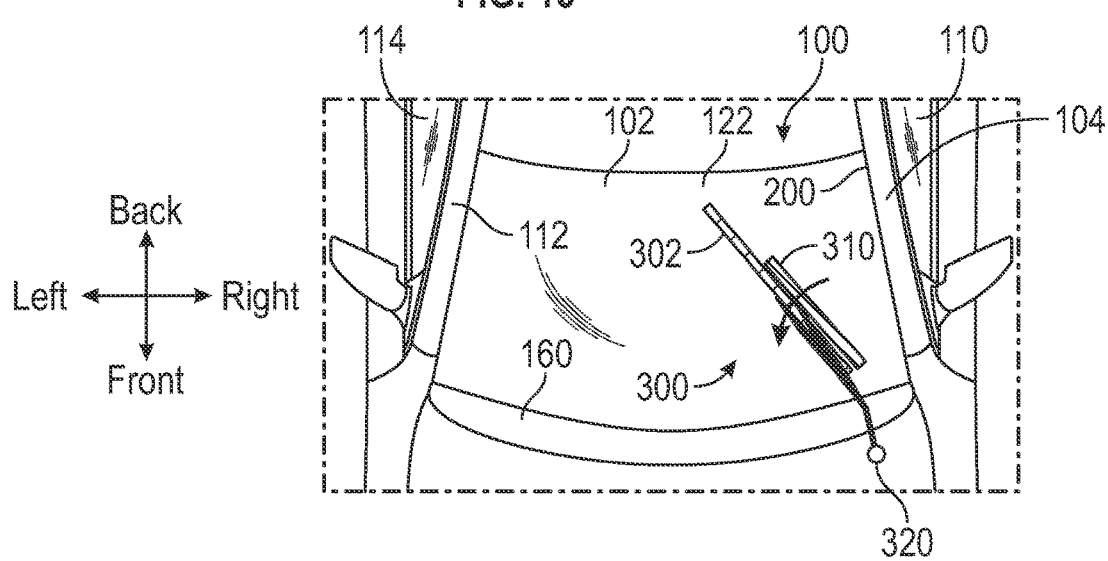
Figure 12:
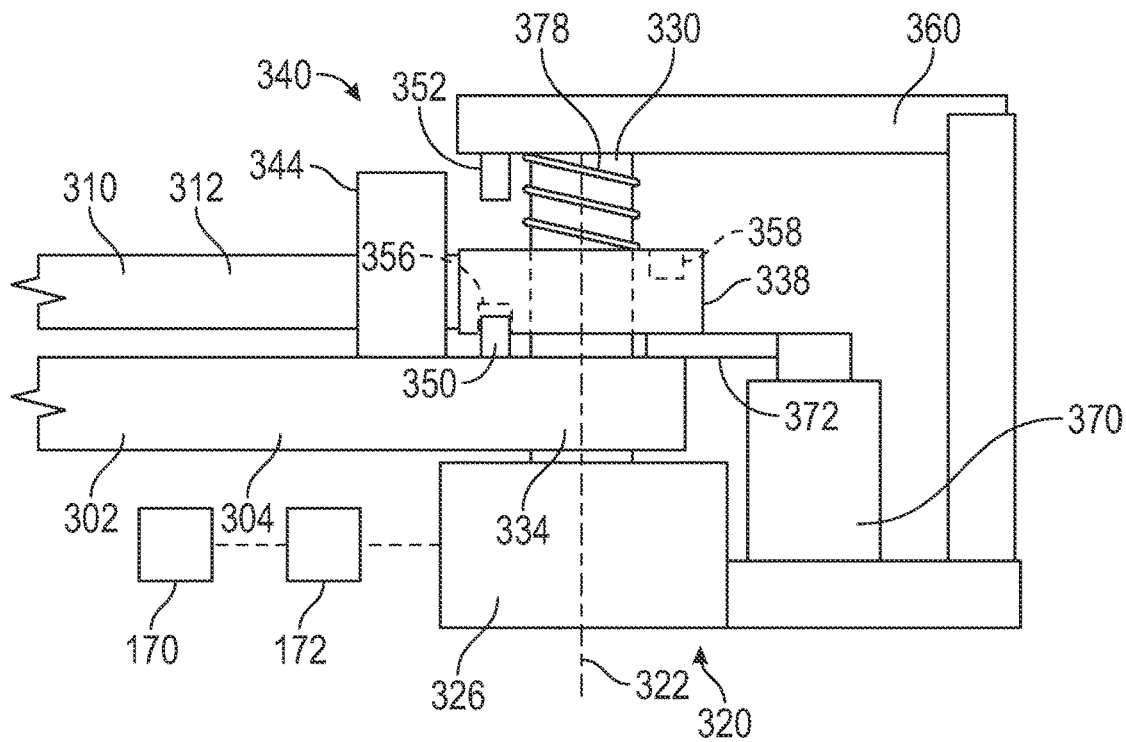
FIG. 12 is a partial schematic side view of a wiper actuation assembly in the position of FIG. 3.

Similar to the drive mechanism(s) of the wiper system 138 described above, the drive mechanism 320 can be at least partially regulated or controlled by the controller 172 (or separate controller) which can be in signal communication with the rain or moisture sensor 170 (schematically depicted, for example, in FIGS. 2 and 12). By way of example, the controller 172 (or separate controller) can be configured to actuate the drive mechanism 320 in response to input from a user (e.g., by the driver actuating a switch or lever in the vehicle) and/or from input of the rain sensor 170 that an amount of water on the windshield 102 exceeds a nominal amount of water. Further, in the depicted aspect of FIG. 12, the drive mechanism 320 can have an electric motor 326 and, optionally, a speed reduction mechanism. The electric motor 326 includes an output shaft 330, and in the present embodiment the output shaft defines the common pivot axis 322 for the wiper system 300. The windshield wiper 302 includes a hub 334 which is rigidly fixed (e.g., by a spline connection) to the output shaft 330 so as to always move with the output shaft. In contrast, the gutter 310 includes a hub 338 that is sized to rotate freely on the output shaft 330 about the pivot axis 322. Accordingly, to account for the freely rotatable gutter 310, the wiper system 300 is adapted to engage or connect the windshield wiper 302 to the gutter 310 in the respective stowed positions (FIG. 3) so that actuation of the drive mechanism 320 moves the windshield wiper 302 together with the gutter 310 about the pivot axis 322 to the respective extended position and deployed position (FIGS. 4 and 5), and then maintain the gutter 310 in the deployed position as the windshield wiper 302 (a) moves via the drive mechanism 320 from the extended position back to the stowed position and/or resting position (FIGS. 6 and 7), (b) reciprocates between the stowed position and/or resting position and the extended position during normal use (FIG. 8) and (c) returns back to the extended position to reengage or reconnect with the gutter 310 so that both can be moved in tandem back to the respective stowed positions (FIGS. 9-11). To this end, the wiper system 300 is further provided with a locking mechanism 340.

Figure 3:
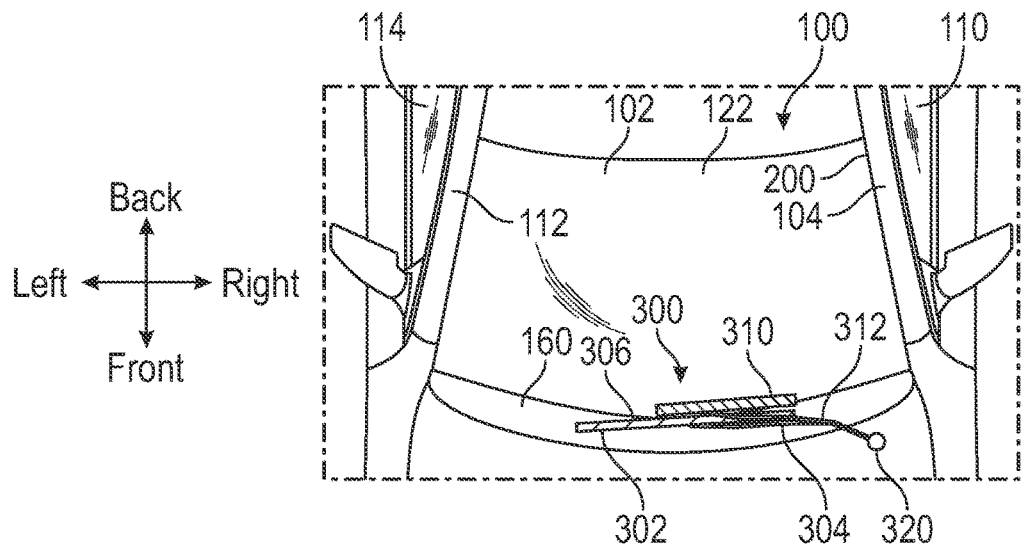
FIGS. 3-11 are top partial top schematic views of a vehicle showing operation of a wiper system according to another aspect of the present disclosure.
Figure 4:
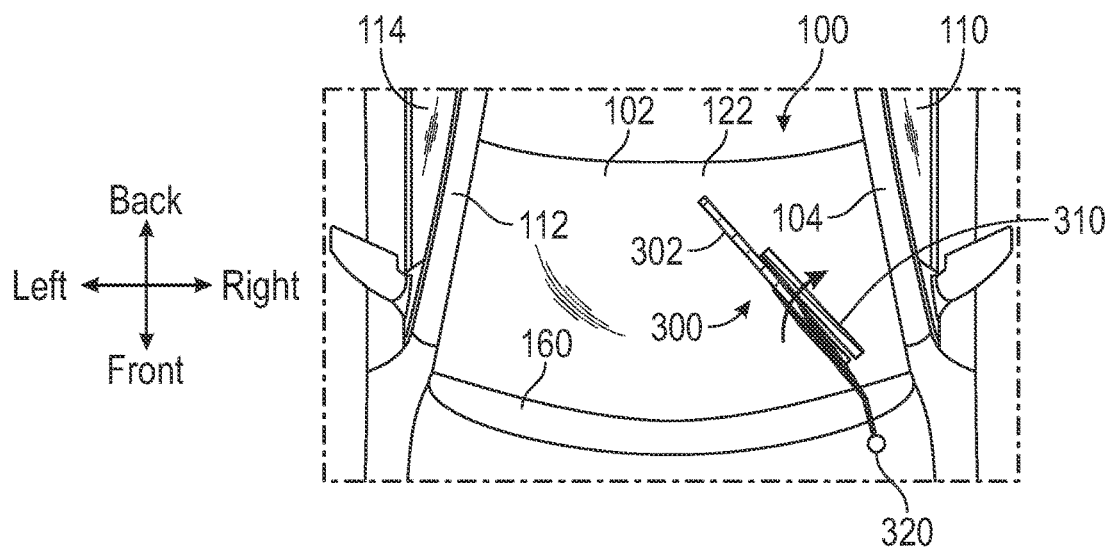
Figure 5:
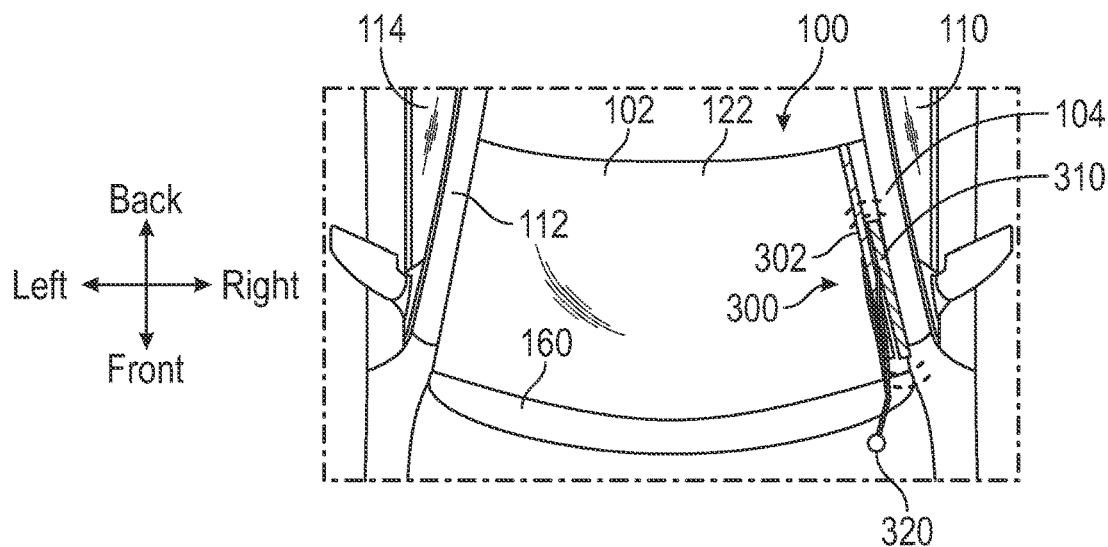
Figure 6:
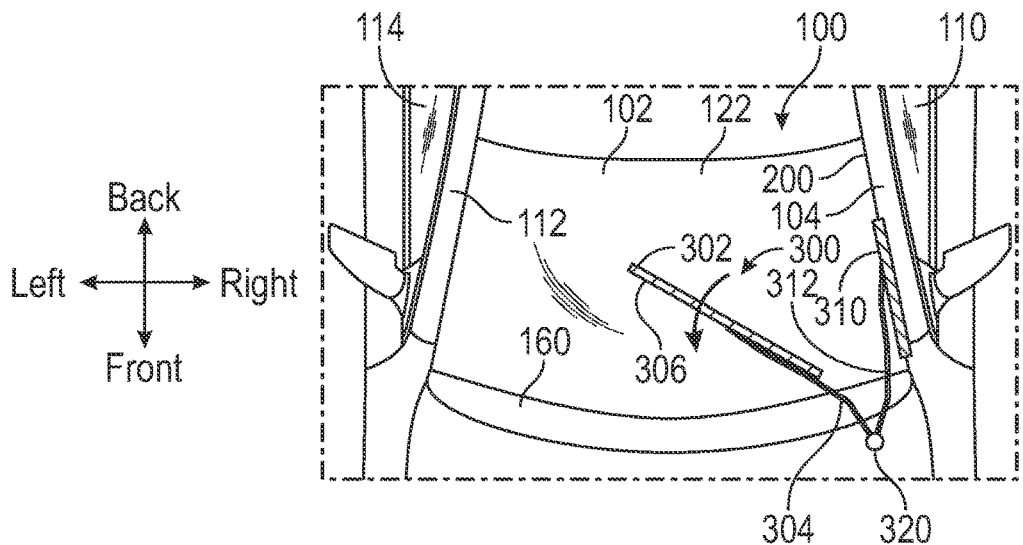
Figure 7:
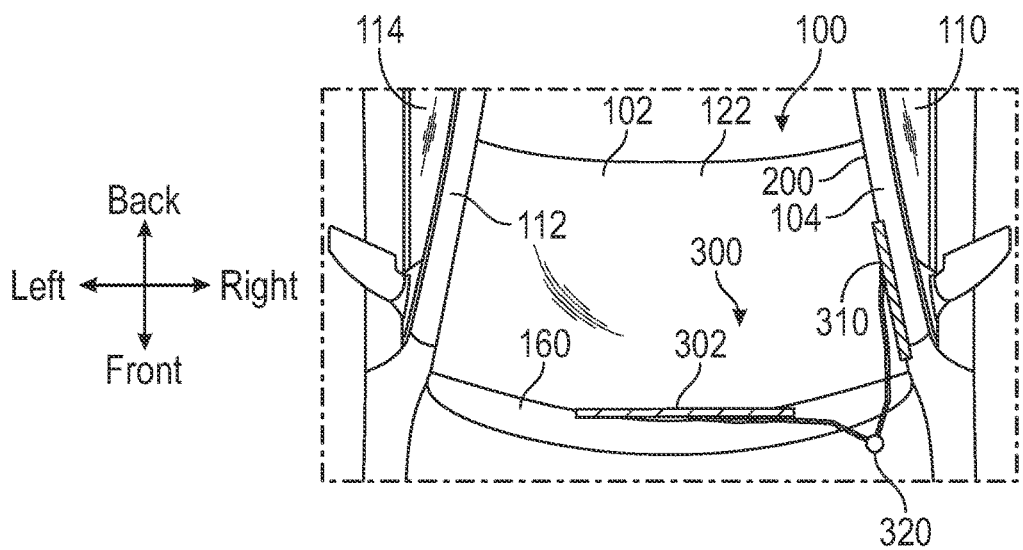
Figure 13:
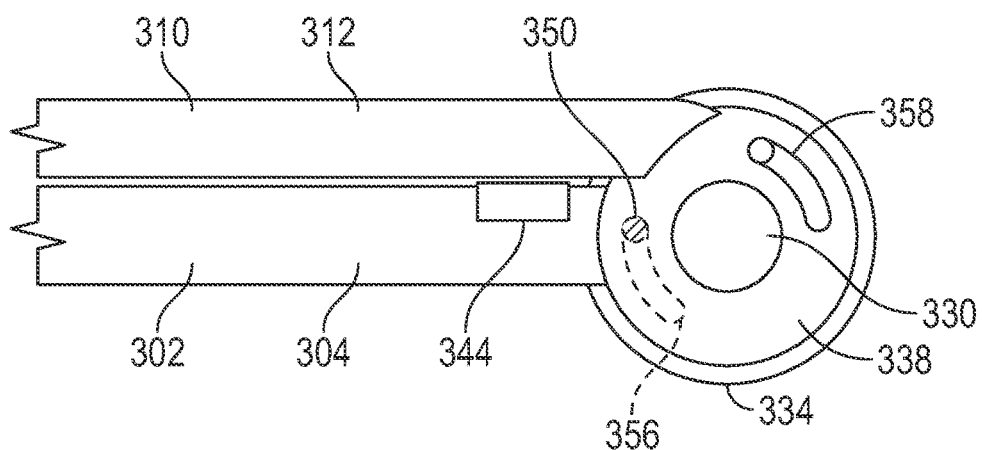
FIG. 13 is a partial schematic top view of FIG. 12.

The locking mechanism 340 is configured to lock the gutter 310 to the windshield wiper 302 in the respective stowed positions (FIGS. 3, 12 and 13). This locking condition allows the windshield wiper 302 and the gutter 310 to be stowed together beneath the cowl 160 during normal (i.e., no rain) weather conditions, and also limits vibration noises between the windshield wiper 302 and gutter 310 while stowed.

The locking mechanism 340 is further configured to unlock the gutter 310 from the windshield wiper 302 prior to actuation of the drive mechanism 320 to move the windshield wiper 302 from the stowed position to the extended position and the gutter 310 from the stowed position to the deployed position (FIGS. 4, 5, 15 and 16). To ensure that the gutter 310 moves in tandem with the windshield wiper 302, the wiper arm 304 is provided with a push bar 344 sized to engage the gutter arm 312. However, it should be appreciated that the gutter 310 can continue to be locked to the windshield wiper 302 as the windshield wiper and the gutter are moved via the drive mechanism 320 to the respective extended position and deployed position.

The locking mechanism 340 is further configured to lock the gutter 310 in the deployed position so that the gutter 310 is statically disposed at the deployed position while the windshield wiper 302 is moved back about the pivot axis 322 from the extended position to the resting position (FIGS. 5-7, 17 and 18). This allows for normal use of the windshield wiper 302, reciprocating between the stowed position and/or resting position and the extended position (FIG. 8). When the wiper system is no longer needed, the windshield wiper 302 is moved from the stowed position and/or resting position back to the extended position where the gutter 310 remains statically disposed at the deployed position. The locking mechanism 340 is further configured to lock the gutter 310 to the windshield wiper 302 allowing for in tandem movement back to the respective stowed positions (FIGS. 9-13).

Figure 14:
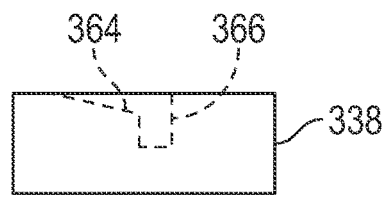
FIG. 14 is a partial schematic side view of FIG. 13.

To allow for the above operational aspects of the locking mechanism 340, the locking mechanism may be a combination of electromechanical means on either an interface of the windshield wiper 302 and the gutter 310, and interface of the gutter 310 and the first A-pillar 104, or within the concentric pivot axis 322 of the windshield wiper 302 and the gutter 310. In the depicted aspect, the locking mechanism 340 includes a pin and guide slot arrangement, wherein the pin and guide arrangement is configured to lock and unlock the windshield wiper 302 and the gutter 310 as described. In FIGS. 12-18, the pin and guide slot arrangement includes first and second pins 350, 352 and first and second guide slots 356, 358 for the respective first and second pins. The first pin 350 is provided on one of the windshield wiper 302 and the gutter 310 and the first guide slot 356 is provided on the other of the windshield wiper 302 and the gutter 310. As shown, the first pin 350 is provided on the hub 334 of the windshield wiper 302 and the first guide slot 356 is provided on the hub 338 of the gutter 310. The second pin 352 is provided on one of the gutter 310 and a drive mechanism support 360 and the second guide slot 358 is provided on the other of gutter 310 and the drive mechanism support 360. As shown, the second pin 352 is provided on the drive mechanism support 360 and the second guide slot 358 is provided on the hub 338 of the gutter 310. In FIG. 14, each of the first and second guide slots 356, 358 can have a ramp section 364 for guiding each of the respective first and second pins 350, 352 to a pin receiving section 366.

Figure 15:
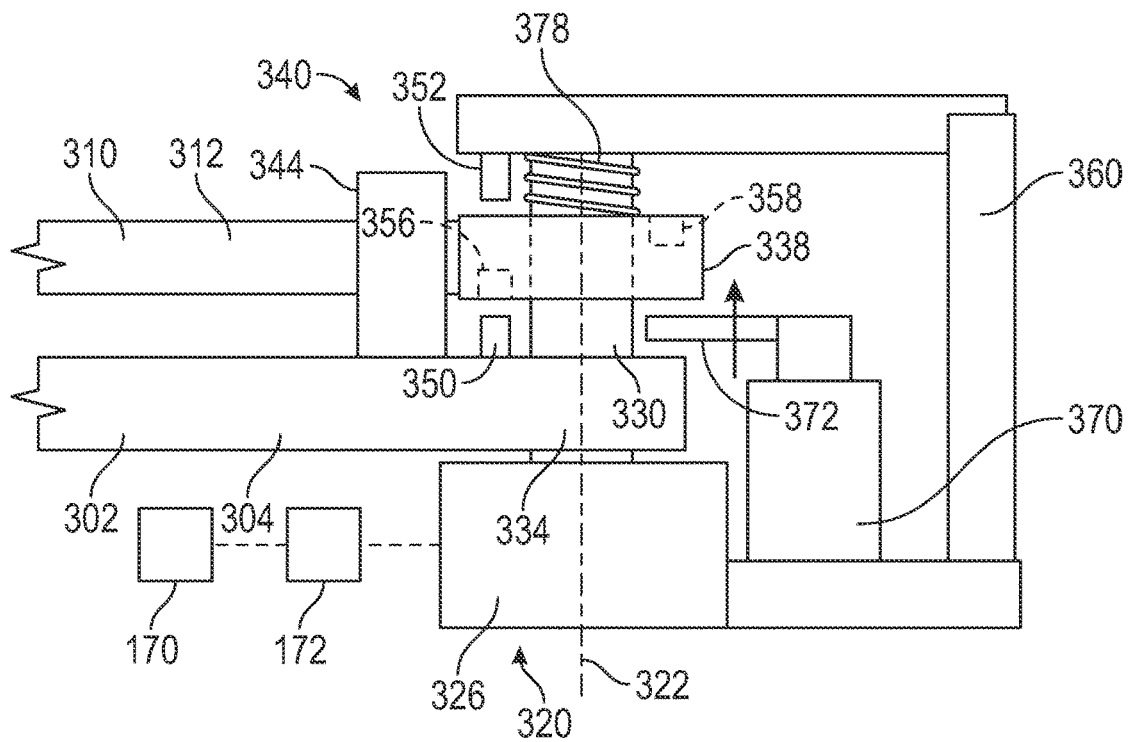
FIG. 15 is a partial schematic side view of the wiper actuation assembly in the position of FIGS. 4 and 11.
Figure 16:
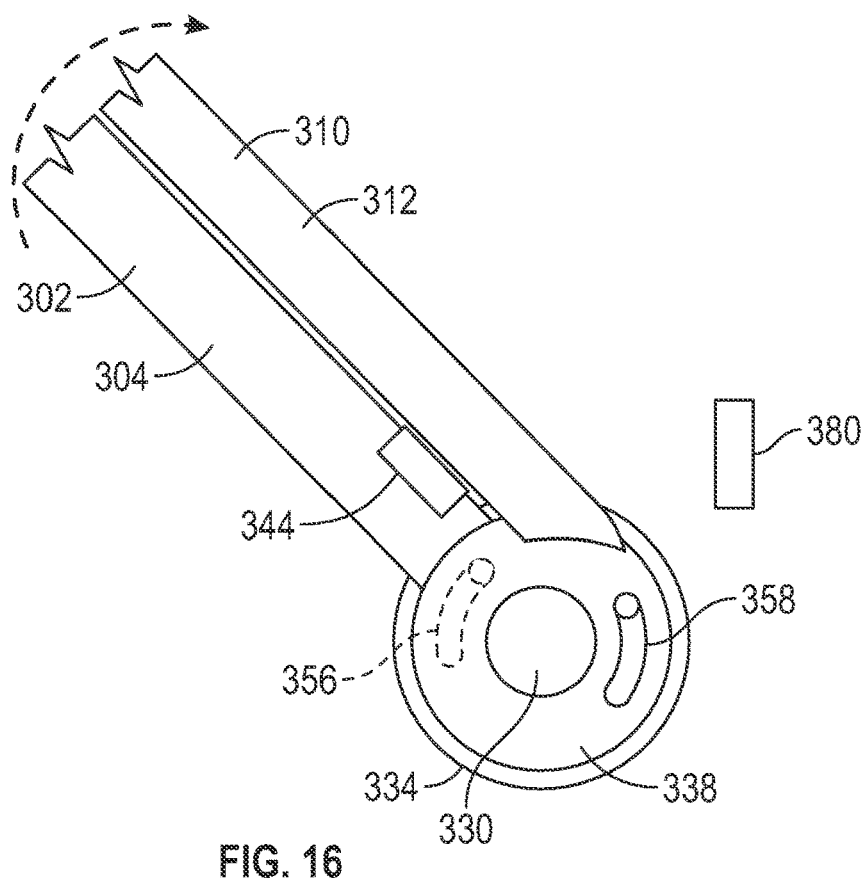
FIG. 16 is a partial schematic top view of FIG. 15.
Figure 17:
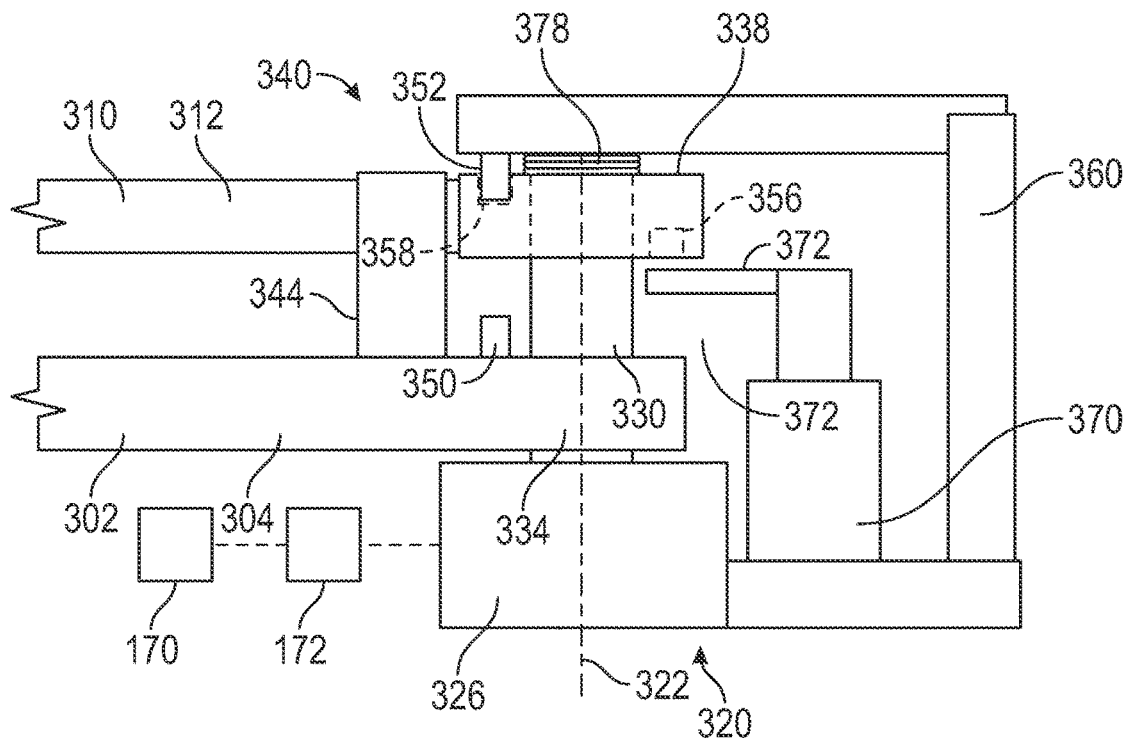
FIG. 17 is a partial schematic side view of the wiper actuation assembly in the position of FIGS. 6, 8 and 9.
Figure 18:
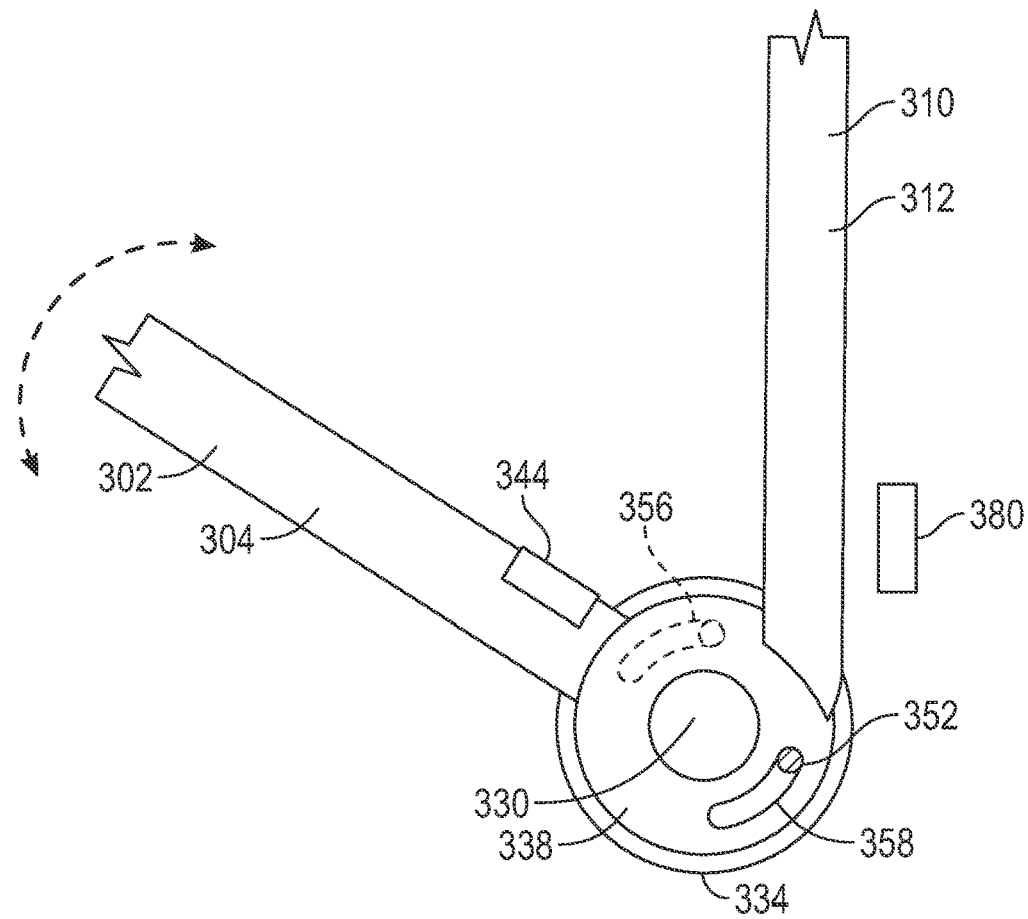
FIG. 18 is a partial schematic top view of FIG. 17.

In FIGS. 12 and 13, where the gutter 310 is locked to the windshield wiper 302 in the respective stowed positions and for movement back to the respective stowed positions, the first pin 350 is received in the first guide slot 356 and the second pin 352 is spaced from the second guide slot 358. In FIGS. 15 and 16, where the gutter 310 is unlocked from the windshield wiper 302 as they move in tandem to the respective deployed position and extended position, the first and second guide pins 350, 352 are spaced from and not received in the first and second guide slots 356, 358. In FIGS. 17 and 18, where the gutter 310 is locked in the deployed position and the windshield wiper 302 is free to move back to the stowed position and/or resting position and reciprocally move between the stowed position and/or resting position and the extended position during normal use, the first pin 350 is spaced from the first guide slot 356 and the second pin 352 is received in the second guide slot 358. To provide for the above selective movements of the first and second pins 350, 352 into and out of the respective first and second slots 356, 358, the locking mechanism 340 includes an actuator 370, such as a linear actuator, adapted to displace the gutter 310 relative to the windshield wiper 302. To assist in this displacement, the actuator 370 can be provided with an arm or fork 372 that directly contacts the hub 338 of the gutter 310. In FIG. 12, where the gutter 310 is locked to the windshield wiper 302, the actuator 370 is in a deactivated, retracted state. In FIG. 15, where the gutter 310 is unlocked from the windshield wiper 302, the actuator 370 is in an intermediate activated, extended state. And in FIG. 17, where the gutter 310 is locked to the drive mechanism support 360, the actuator 370 is in a full activated, extended state. Further, a biasing member, such as the depicted compression spring 378, can be provided for biasing the gutter 310 toward the windshield wiper 302. When the actuator 370 is in the deactivated state, the spring 378 can hold the first pin 350 within the first guide slot 356 to maintain the locking relationship of the windshield wiper 302 and the gutter 310, when required. In FIGS. 16 and 18, a detent or stop 380 can be provided immediately adjacent the first A-pillar 104 to prevent over travel of the gutter 310. Again, it should be appreciated that the above described controller 172 can be configured to actuate the drive mechanism 320 and the locking mechanism 340 in response to input from at least one of a user and a sensor configured to detect water on the exterior surface 122 of the windshield 102.

As is evident from the foregoing, a method of operating a wiper system 300 of a vehicle 100 is provided. The wiper system 300 includes a wiper 302 movable between a stowed position and an optional resting position and between the stowed position and/or resting position and an extended position, and a gutter 310 movable between a stowed position and a deployed position. The method comprises coupling the wiper 302 to the gutter 310 at the respective stowed positions; actuating a drive mechanism 320 in response to one of a user command and a sensor input indicating water on an exterior surface 122 of windshield 102 to move the wiper 302 together with the gutter 310 about a common pivot axis 322 over the exterior surface of the windshield to the respective extended position and the deployed position, where in the deployed position the gutter 310 is located along a lateral edge of the windshield 102. The exemplary method further includes locking the gutter 310 at the deployed position via a locking mechanism 340, and with the gutter 310 locked at the deployed position moving the wiper 302 via the drive mechanism 320 from the extended position back to the stowed position and/or resting position.

The exemplary method further includes decoupling the gutter 310 from the wiper 302 prior to the in tandem movement via the drive mechanism 320 to the respective deployed position and extended position. With the gutter 310 locked in the deployed position, the exemplary method further includes actuating the drive mechanism to move the wiper 302 between the stowed position and/or resting position and the extended position. With the wiper 302 in the extended position, the exemplary method further includes unlocking the gutter 310 and coupling the gutter 310 to the wiper 302, and moving the wiper together with the gutter via the drive mechanism back to the respective stowed positions. The exemplary method further includes sealingly engaging the exterior surface 122 of the windshield 102 with the gutter 310 to prevent water from flowing beneath the gutter 310 in the deployed position by providing a seal between gutter 310 and the exterior surface 122 of the windshield 102, the seal connected to the arm and extended parallel to the arm.

It will be appreciated that various embodiments of the above-disclosed features and functions, or alternatives or varieties thereof, may be desirably combined into many other different systems or applications. Moreover, any term of degree used herein, such as "substantially", means a reasonable amount of deviation of the modified word is contemplated such that the end result is not significantly changed. Also that various presently unforeseen or unanticipated alternatives, modifications, variations or improvements therein may be subsequently made by those skilled in the art which are also intended to be encompassed by the following claims.

The invention claimed is:

1. A wiper system for a vehicle comprising:
  a drive mechanism;
  a wiper operably connected to the drive mechanism, the wiper has a stowed position and an extended position, the drive mechanism configured to reciprocally rotate the wiper about a pivot axis to sweep a defined area of an exterior surface of a windshield;
  a gutter operably connected to the drive mechanism, the drive mechanism configured to rotate the gutter together with the wiper about the pivot axis between a stowed position and a deployed position wherein the gutter extends along a lateral edge of the windshield, wherein the gutter is adapted to be statically disposed at the deployed position while the wiper is reciprocally rotated about the pivot axis; and
  a locking mechanism, wherein with the wiper in the extended position and the putter statically disposed at the deployed position the locking mechanism is configured to lock the gutter to the wiper allowing for in tandem movement back to the respective stowed positions.

2. The wiper system of claim 1, wherein the locking mechanism is configured to lock the gutter in the deployed position.

3. The wiper system of claim 2, wherein the locking mechanism is configured to lock the gutter to the wiper in the respective stowed positions.

4. The wiper system of claim 3, wherein the locking mechanism is configured to unlock the gutter from the wiper as the wiper moves from the stowed position to the extended position and the gutter moves together with the wiper from the stowed position to the deployed position.

5. The wiper system of claim 1, wherein the locking mechanism includes a pin and guide slot arrangement.

6. The wiper system of claim 5, including first and second pins and first and second guide slots, the first pin received in the first guide slot and the second pin spaced from the second guide slot with the gutter locked to wiper, and the first pin spaced from the first guide slot and the second pin received in the second guide slot with the gutter locked in the deployed position.

7. The wiper system of claim 6, wherein the locking mechanism includes an actuator to displace the gutter relative to the wiper to move the first and second pins into and out of the respective first and second slots.

8. The wiper system of claim 7, including a biasing member for biasing the gutter toward the wiper.

9. The wiper system of claim 6, wherein the first pin is provided on the wiper, the second pin is provided on a drive mechanism support, and the first and second slots are provided on the gutter.

10. The wiper system of claim 1, wherein a seal is connected to the gutter for engaging the exterior surface of the windshield in the deployed position of the arm.

11. The wiper system of claim 1, wherein the gutter includes an inboard side and an outboard side, the inboard side is curved inwardly toward the outboard side to define a water channel.

12. The wiper system of claim 1, further comprising a controller configured to actuate the drive mechanism and the locking mechanism in response to input from at least one of a user and a sensor configured to detect water on the exterior surface of the associated windshield.

13. The wiper system of claim 1, wherein the locking mechanism is configured to:
lock the gutter to the windshield wiper in the respective stowed positions, unlock the gutter from the windshield wiper as the windshield wiper moves from the stowed position to the extended position and the gutter moves in tandem with the windshield wiper from the stowed position to the deployed position, and
lock the gutter in the deployed position as the windshield wiper is reciprocally moved about the pivot axis.

14. A vehicle comprising:
a body including an A-pillar;
a windshield having an exterior surface and a lateral edge secured to the A-pillar, wherein the exterior surface of the windshield is substantially continuous with an exterior surface of the A-pillar;
a drive mechanism coupled to the body;
a windshield wiper operably connected to the drive mechanism, the windshield wiper has a stowed position and an extended position, the drive mechanism configured to reciprocally rotate the windshield wiper about a pivot axis to sweep a defined windshield area;
a gutter operably connected to the drive mechanism, the drive mechanism configured to rotate the gutter together with the windshield wiper about the pivot axis between a stowed position and a deployed position wherein the gutter extends along the lateral edge of the windshield, wherein the gutter is configured to be statically disposed in the deployed position while the windshield wiper is reciprocally moved about the pivot axis; and
a locking mechanism for selectively locking the gutter directly to the windshield wiper allowing for in tandem movement of the windshield wiper and the gutter.

15. The vehicle of claim 14, wherein the exterior surface of the windshield is substantially flush with the exterior surface of the A-pillar such that a contour of the exterior surface of the vehicle is substantially continuous from the exterior surface the windshield to the exterior surface of the A-pillar.

16. The vehicle of claim 15, wherein the exterior surface of the vehicle is devoid of a static incongruity between the exterior surface of the windshield and the exterior surface of the A-pillar.

17. A method of operating a wiper system of a vehicle, the wiper system including a wiper having a stowed position and an extended position, and a gutter having a stowed position and a deployed position, the method comprising:
coupling the wiper to the gutter at the respective stowed positions;
actuating a drive mechanism in response to one of a user command and a sensor input indicating water on an exterior surface of windshield to move the wiper together with the gutter about a common pivot axis over the exterior surface of the windshield to the respective extended position and the deployed position, where in the deployed position the gutter is located along a lateral edge of the windshield;
locking the gutter at the deployed position via a locking mechanism;
with the gutter locked at the deployed position reciprocally moving the wiper via the drive mechanism about the pivot axis;
with the wiper in the extended position, unlocking the gutter at the deployed position and coupling the gutter to the wiper via the locking mechanism; and
moving the wiper together with the gutter directly coupled thereto via the drive mechanism back to the respective stowed positions.

18. The method of claim 17, including decoupling the gutter from the wiper prior to the in tandem movement via the drive mechanism to the respective deployed position and extended position.

* * * * *